United States Patent Office 2,750,173
Patented June 12, 1956

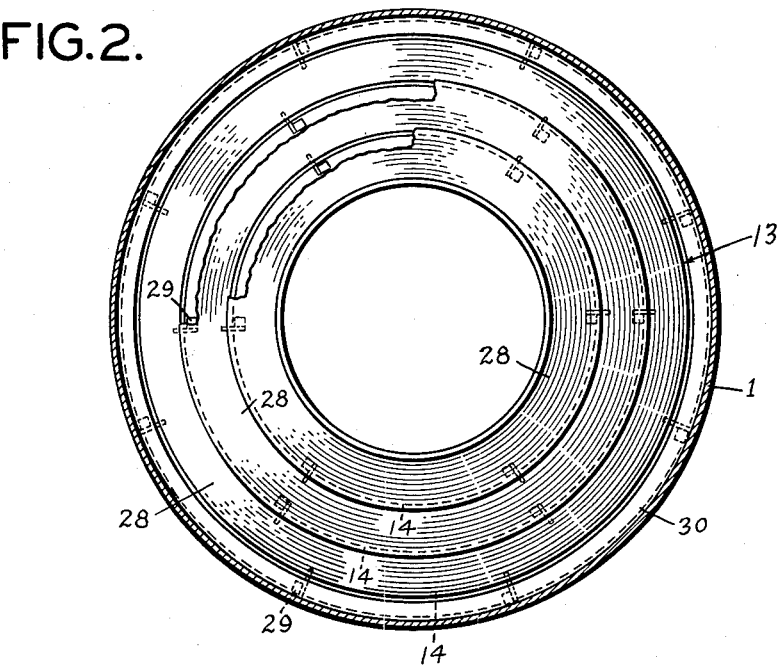
FIG.2.
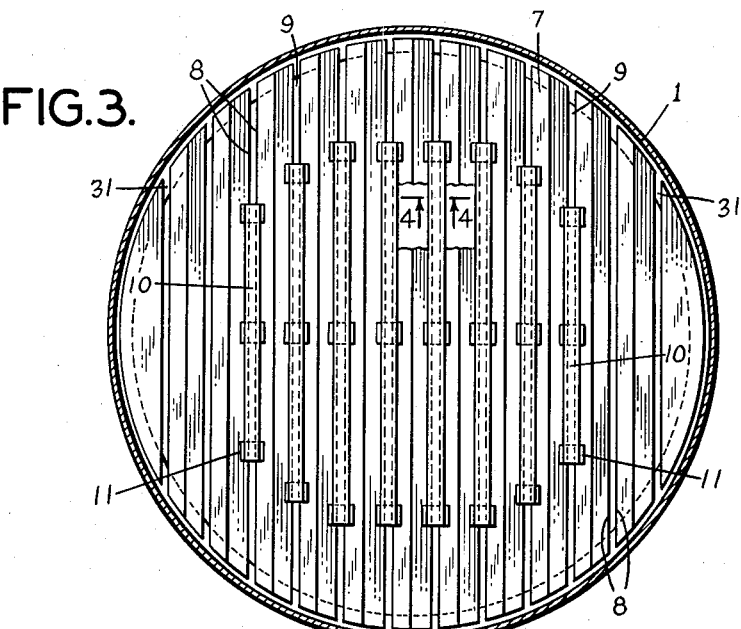
FIG.3.
FIG.4.
INVENTORS.
FRANS WETHLY
LEONHARD T. HARTMANN
BY Ernest A. Polin
ATTORNEY.

2,750,173

GAS-LIQUID CONTACT PROCESS AND APPARATUS

Leonhard T. Hartmann, New York, and Frans Wethly, Manhasset, N. Y., assignors to Allied Chemical & Dye Corporation, New York, N. Y., a corporation of New York Application November 9, 1953, Serial No. 391,007

3 Claims. (Cl. 261—111)

This invention relates to means for intimately contacting gas with liquid and more particularly refers to an improved spray-type tower for intimately contacting gas with liquid especially adaptable for cooling of coke oven gas or absorption of coke oven gas constituents such as ammonia and light oil.

Gas-liquid contact devices utilizing packing, bubble cap trays, perforated plates and complex baffle arrangements have been employed with varying degrees of success. Disadvantages attaching to these devices include bulky construction, limited capacity due to low space efficiency, high capital investment, frequent plugging of apparatus, and, of considerable significance to the coke oven gas industry, excessive resistance to the flow of gases. In some cases towers have been employed wherein liquid introduced into the top of the tower was simply sprayed downwardly countercurrent to a rising stream of gases entering thae bottom of the tower. However, unequal distribution and poor contact of gas and liquid occurred, thereby lowering the efficiency of operation. Better contact but not distribution of liquid may be obtained by the introduction of large amounts of liquid at, of course, a sacrifice in dilution of absorbed gas components in the liquid with the attended expense of handling the dilute liquor in stripping and other recovery operations. Some improvement has been made on the spray-type devices by use of a plurality of spray sections, each equipped with piping, pumps and control means for mechanically forcing the liquid from one to another. The addition of such auxiliary equipment materially increases the cost of the apparatus and complicates the operation by the requirement of manipulating the multitude of controls; therefore, in the coke oven industry devices of this type are infrequently employed. Also, as in the case of treating coke oven products, the fluids frequently contain suspended solids which cause considerable difficulty from clogging or wearing out of the pumps or other portions of the apparatus because of corrosion and abrasion.

An object of the present invention is to provide an improved spray-type tower of economical construction adapted to contact liquid and gas with increased efficiency of contact.

Another object of the invention is to provide an improved process for contacting gas and liquid whereby increased efficiency of contact is obtained.

Other objects and advantages will be apparent from the following description and accompanying drawings.

In accordance with the present invention, a process for intimately contacting a gas with a liquid is carried out by introducing the gas into the lower portion of a contact zone, introducing the liquid in the form of a substantially conical spray from the upper portion of said zone, the outer portions of the spray hitting the walls of the contact zone so that the major portion of said spray passes along the peripheral portions of said zone, passing the gas in intimate contact with the liquid through a substantially annular space in the lower peripheral portions of the contact zone, and then passing the gas through substantially the shape and form of the conical spray.

One type of absorption or cooling tower that may be used in practice of the invention involves a single contact chamber, or, if desired or required, a plurality of successive contact chambers. A feature of the present invention resides in providing each contact chamber with a grid tray positioned in the lower portion of the chamber. This tray contains slots extending across the tray for passage of gas and liquid therethrough, and is partially blocked to restrict or impede flow of gas in the central tray portions. By means of a grid tray of such construction the preponderant portion of the gas passes through the slots and through the peripheral portions of the tower to intimately contact the major portion of the spray which likewise is passed through the peripheral portions of the tower in the form of a substantially conical spray, and the residual gas escaping through the central portions of the tower intimately contacts the minor amounts of centrally dispersed spray. Another feature of the present invention resides in providing beneath each spray device positioned at the top of each contact chamber a substantially frusto-conical stepped baffle arrangement in which the baffles also are substantially frusto-conical, said baffle arrangement being inclined upwardly from the outer portions of the tower toward the bottom of the spray device. Such baffle arrangement receives the substantially conical spray in its interior portions, preferably with minimum impingement of liquid on the baffles, and directs the gas rising upwardly through the peripheral portions of the tower and through substantially the shape and form of the conical spray. The coaction of the grid tray and baffle arrangement serves to materially increase the efficiency of contact of gas and liquid. Further, in order to increase efficiency of liquid-gas contact, there is preferably provided, intermediate the baffle arrangement and the grid tray, a redistributor adapted to further distribute liquid as stratum adjacent but substantially out of contact with the walls of the tower so that the liquid is directed into the path of the gas flowing through the slots of the grid tray.

In a specific embodiment of the invention, the apparatus comprises a cylindrical casing having a gas inlet and a liquid outlet near the bottom and a gas outlet and a liquid inlet near the top, and a plurality of spaced contact chambers disposed along the height of the casing, intermediate the gas outlet and liquid inlet near the top of the casing and the gas inlet and liquid outlet near the bottom of the casing, each chamber comprising a grid tray in the lower portion of the chamber containing slots extending across the plate for passage of liquid and gas therethrough and being partially blocked against passage of gas in the central plate portions, a substantially frusto-conical stepped baffle arrangement in which the baffles also are substantially frusto-conical, and a spray device which delivers the liquid as spray toward and against the walls of the chamber substantially entirely within a conical volume which is nested within and spaced from the surface of the cone bounded by the inner surfaces of the baffle arrangement. Also, there is provided, intermediate the baffle arrangement and grid tray, a redistributor adapted to further distribute liquid as stratum adjacent but substantially out of contact with the walls of the tower so that the liquid is directed into the path of the gas flowing through the slots of the grid tray. The uppermost spray device is provided with a pressure spray nozzle and means are connected to the succeeding spray devices, said means being adapted to collect the liquid from the superimposed chamber and to provide the necessary fluid head for discharge of spray. By such construction the piping usually required for redistribution of absorbing liquid is eliminated.

Figure 2 is a plan view of the apparatus taken along line 2—2 of Figure 1.

Figure 3 is a plan view of the apparatus taken along line 3—3 of Figure 1.

Figure 4 shows a detailed view of the means blocking the central portions of grid tray 7.

Figure 1:
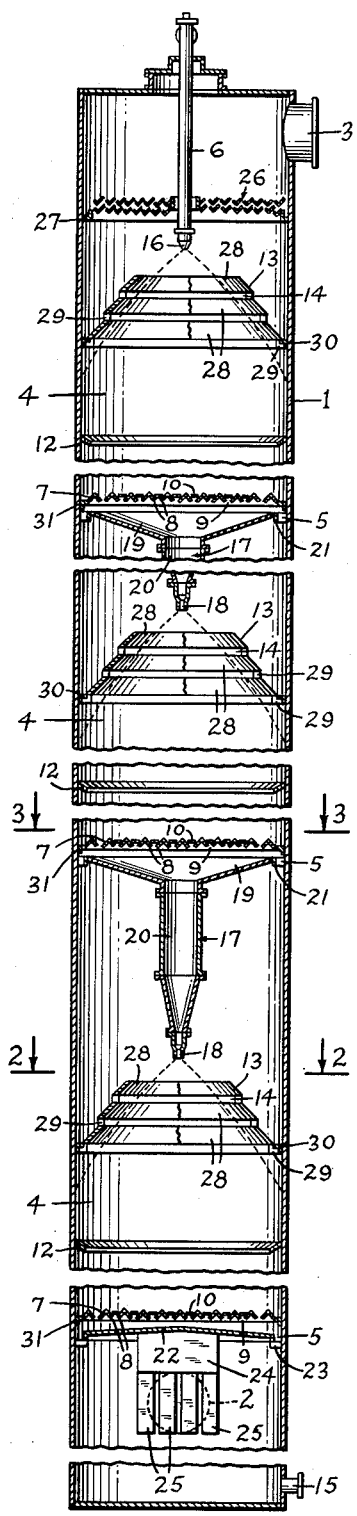
Figure 1 is a vertical sectional view with portions cut away of the improved spray-type absorption tower embodying the present invention.

Referring to the drawings, the tower comprises a vertical cylindrical shell or casing 1 having a gas inlet 2 through which gas enters disposed below the spray means and a gas outlet 3 near the top of the tower through which gas discharges. The tower is provided with a series of superimposed contact chambers 4. Gas introduced through inlet 2 passes upwardly into each contact chamber through an annular opening 5 which extends around the periphery of the tower. Liquid absorption medium is introduced into uppermost contact chamber 4 through a spray device 6 which delivers the absorption spray as finely divided particles or mist in substantially conical form extending outwardly to the walls of casing 1. The absorption medium, the major portion of which passes downwardly through the peripheral portions of the tower, falls upon a grid tray 7 attached to casing 1 by means of annular angle iron 31 in the lower portion of uppermost contact chamber 4. Tray 7 provides lower peaks 8 in serrations extending across the plate, the lower peaks being spaced to provide slots 9 for passage of liquid and gas therethrough in the peripheral tray portions and being partially blocked against passage of gas by covers 10 attached to tray 7 by clips 11 in the central tray portions. By use of such construction the preponderant portion, as upwards of about two thirds of the gas, passes through slots 9, intimately contacts the liquid passing therethrough, and is directed upwardly along the peripheral portions of the tower where it intimately contacts the major portion of spray passing along the peripheral portions of the tower. The residual gas seeps through the partial openings in the central portions of tray 7, contacts liquid flowing therethrough and rises through the central portions of the tower where it intimately contacts the minor amounts of centrally dispersed spray. Redistributor 12 extending around the periphery of casing 1, and preferably welded thereto, is adapted to further distribute liquid as stratum adjacent but substantially out of contact with the walls of the tower so that the liquid is directed into the path of the gas flowing through the slots of the grid tray 7. Baffle arrangement 13, which is a substantially frusto-conical stepped arrangement in which the individual baffles 28 also are substantially frusto-conical, is inclined upwardly from the outer portions of the tower toward the bottom of the spray device and serves to receive the substantially conical spray nested within and spaced from the surface of the cone bounded by the inner surfaces of the baffle arrangement. Gas passing upwardly through the conical spray is thereafter deflected inwardly by the baffles to flow through the intervening space between the spray and the baffles generally counter to the spray.

Metered amounts of gas are vented through openings 14 between baffles 28 in baffle arrangement 13, thereby permitting preferably substantially constant gas velocities within the spray area which approximate those in unobstructed portions of the tower without interfering with or modifying the desired distribution of spray across the tower. The openings, therefore, enable high capacity in the tower by reason of high efficiency throughout the entire length of each contact chamber. The absorbing liquid drops to the bottom of the tower through lowermost annular opening 5, contacting the incoming gas at this point, and passes out of the tower through outlet 15.

The uppermost spray device 6 is provided with a pressure spray nozzle 16 while the succeeding spray devices 17 are provided with low-head, gravity-type nozzles 18. Above each of spray devices 17 are positioned a collector pan 19 and tube 20, adapted to collect the liquid from the superimposed chamber and to provide the necessary fluid head for discharge of spray. Each spray unit comprising spray device 17, collector pan 19 and tube 20 is supported by means of brackets 21 attached to casing 1.

A greater or smaller number of contact chambers 4 than shown in Figure 1 may be employed, depending, of course, upon the process requirements. Casing 1 may be provided with conventional windows and manholes, not shown in the drawing, for visibility and ready access into the tower.

At the bottom of the tower is provided a gas distributor 22, supported by means of brackets 23 attached to casing 1. Distributor 22 spans substantially the entire area of the tower and permits introduction of the gas only to the periphery of casing 1 through lowermost opening 5. Attached to the bottom of distributor 22 is a member or baffle 24 from which depends a series of plates 25, which serve to distribute the gas uniformly around the periphery of the casing. At the top of the tower is provided a two-row grillage type entrainment device 26, supported by annular angle iron 27, which serves to remove absorbing liquid from the gas passing out of the tower.

As shown in Figure 2, the individual baffles 28 of baffle arrangement 13 are joined together by means of brackets 29, and the lowermost baffle is joined by brackets 29 to an annular angle iron support 30 connected to casing 1.

Although certain preferred embodiments of the invention have been disclosed for purposes of illustration, it is evident that various changes and modifications may be made therein without departing from the spirit and the scope of the invention.

I claim:

1. A contact chamber adapted for use in gas and liquid countercurrent contact apparatus comprising a substantially annular space for introduction of gas in the lower peripheral portions of the chamber, a grid tray directly above said annular space containing slots extending across the tray for passage of gas and liquid therethrough, said slots being provided in the central portions of the tray with members for substantially blocking flow of gas therethrough, a single spray device adapted to deliver a conical spray into the upper portion of the chamber from the center thereof of the walls of the chamber, and an open-ended, frusto-conical arrangement of stepped frusto-conical baffles extending from the central portion of said chamber to the walls thereof, said arrangement having its open upper end below said spray device and arranged to receive substantially the entire conical spray, said spray device, baffle arrangement and blocked, slotted tray defining between them the aforesaid contact chamber.

2. A gas and liquid countercurrent contact apparatus comprising an upright casing, a gas inlet and liquid outlet near the bottom of the casing, a gas outlet and liquid inlet near the top of the casing, and a plurality of vertically contiguous contact chambers disposed in series between the sets of inlets and outlets, each chamber comprising a substantially annular space for introduction of gas in the lower peripheral portions of the chamber, a grid tray directly above said annular space containing slots extending across the tray for passage of gas and liquid therethrough, said slots being provided in the central portions of the tray with members for substantially blocking flow of gas therethrough, a single spray device adapted to deliver a conical spray into the upper portion of the chamber from the center thereof to the walls of the chamber, and an open-ended, frusto-conical arrangement of stepped frusto-conical baffles extending from the central portion of said chamber to the walls thereof, said arrangement having its open upper end below said spray device and arranged to receive substantially the entire conical spray, said spray device, baffle arrangement and blocked, slotted tray defining between them the aforesaid contact chamber.

3. A gas and liquid countercurrent contact apparatus comprising an upright casing, a gas inlet and liquid outlet near the bottom of the casing, a gas outlet and liquid inlet near the top of the casing, and a plurality of vertically contiguous contact chambers disposed in series between the sets of inlets and outlets, each chamber comprising a substantially annular space for introduction of gas in the lower peripheral portions of the chamber, a grid tray directly above said annular space containing slots extending across the tray for passage of gas and liquid therethrough, said slots being provided in the central portions of the tray with members for substantially blocking flow of gas therethrough, a single spray device adapted to deliver a conical spray into the upper portion of the chamber from the center thereof to the walls of the chamber, an open-ended, frusto-conical arrangement of stepped frusto-conical baffles extending from the central portion of said chamber to the walls thereof, said arrangement having its open upper end below said spray device and arranged to receive substantially the entire conical spray, said baffles being positioned surrounding the conical spray and generally out of the region of direct impingement of the spray on the baffles, and a redistributor adapted to deflect liquid flowing down the inside chamber walls from said walls into the path of the gas flowing through the slots of the peripheral portions of the grid tray, said spray device, baffle arrangement and blocked, slotted tray defining between them the aforesaid contact chamber; each contact chamber, except the lowermost chamber, having disposed below the grid tray and annular space, a collecting pan for spray liquid extending entirely across said casing, and having disposed centrally of said pan a discharge conduit for feeding the collecting liquid to the spray device of the subjacent chamber.

References Cited in the file of this patent

UNITED STATES PATENTS

| | | |
|---|---|---|
| 1,989,033 | Weir | Jan. 22, 1935 |
| 2,568,875 | Wethly et al. | Sept. 25, 1951 |
| 2,675,215 | Otto | Apr. 13, 1954 |
| 2,678,199 | Koch | May 11, 1954 |

FOREIGN PATENTS

| | | |
|---|---|---|
| 120,304 | Great Britain | Nov. 7, 1918 |
| 551,359 | Germany | May 30, 1932 |
| 885,548 | France | May 31, 1943 |